May 5, 1931.  A. E. CLAWSON  1,803,996
PRESSURE RESPONSIVE INSTRUMENT
Filed July 26, 1928
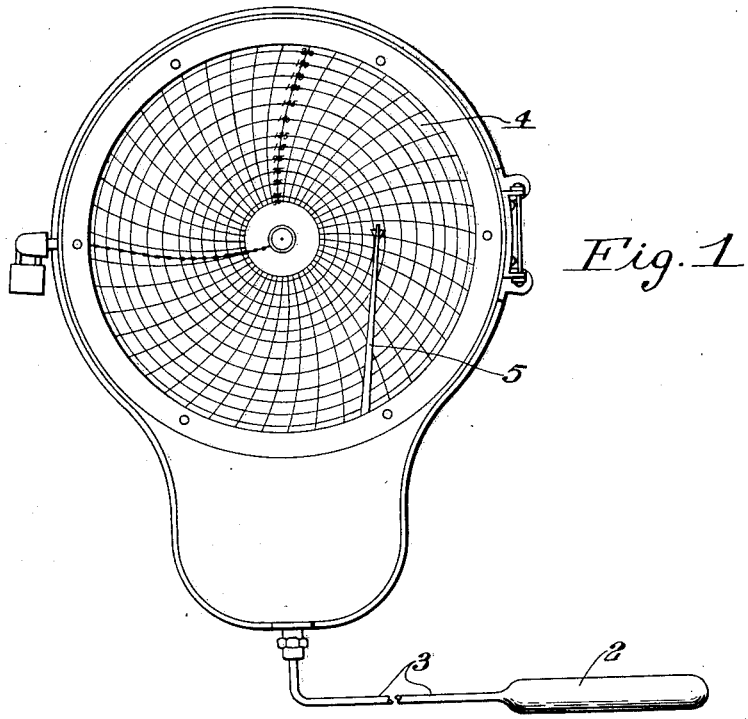
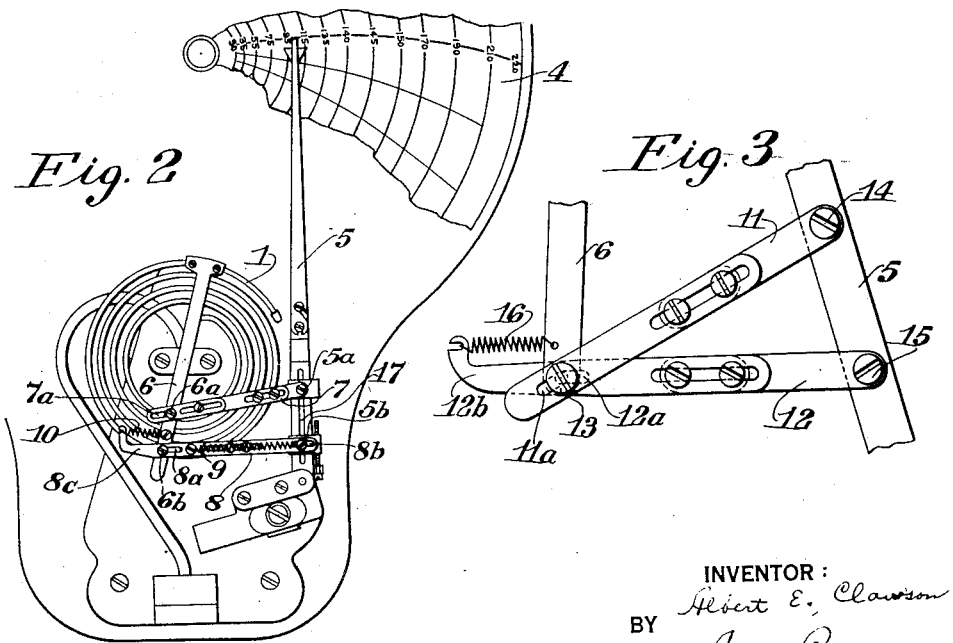
INVENTOR:
Albert E. Clawson
BY
Alfred Burger
ATTORNEY Patented May 5, 1931

1,803,996

UNITED STATES PATENT OFFICE

ALBERT E. CLAWSON, OF BRYN MAWR, PENNSYLVANIA, ASSIGNOR TO TAYLOR INSTRUMENT COMPANIES, OF ROCHESTER, NEW YORK, A CORPORATION OF NEW YORK

PRESSURE RESPONSIVE INSTRUMENT

Application filed July 26, 1928. Serial No. 295,365.

This invention relates to that general class of devices which include as a motor element a pressure-responsive device, of the Bourdon-tube type, for instance.

In some of the applications of instruments of that type it was found desirable to have open scale readings over a relatively short range and condensed readings over another relatively larger range. Many contrivances have been proposed to accomplish the purpose referred to, but to my knowledge they are all based upon a throttling or choking effect upon the Bourdon spring, i. e., the motor element itself from which the indicating movement is derived. The usual construction includes a resistance for retarding the movement of the Bourdon spring during part of its movement.

It is the main object of the invention to produce an instrument of the class referred to, having an open scale portion and a condensed scale portion and corresponding differential rates of movement of the indicator hand, without a substantial retarding action upon the motor element.

For a full understanding of the invention, the principle of operation on which it is based, the points of novelty and the advantages resulting from it, reference is made to the accompanying drawings, wherein:

Fig. 1 is a front view of an instrument embodying the invention;

Fig. 2 is a fragmentary enlarged face view of the mechanism more particularly identified with the invention; and Fig. 3 is a fragmentary face view of another form of the invention.

For the purpose of illustration, reference is made to a temperature recorder which includes as an operative unit a Bourdon tube or spring 1, a bulb 2 and a capillary connection 3. In the particular instance, the unit may be assumed to be filled with a fluid medium whose volume varies as a function of variations in temperature at the bulb. The changes in volume are accompanied by corresponding changes in pressure in the system, which in turn react upon the Bourdon spring to produce corresponding changes in the position of the free end thereof, all of which is well understood.

The instrument also contains a chart 4 and a pen arm 5 connected with the Bourdon spring for tracing a record on the chart.

As appears from Fig. 1, the chart contains three scale ranges, viz: an inner range indicating temperature values from say 30° to 135° F., an outer range indicating values from 150° to 220° and an intermediate range indicating values from 135° to 150°. While the two outer scale ranges are condensed, the intermediate range is open. The particular form of chart or scale and range division is an adaptation for temperature measurements and records in connection with the pasturization of milk and it is understood that in principle there is no limit in respect to range or divisions thereof.

The invention comprises a particular form of mechanism for transmitting the motion of the Bourdon spring or other pressure-responsive device to the pen arm, indicator arm or other element to be moved by the Bourdon spring. Briefly expressed, the invention comprises transmission mechanism which operates to provide one rate of transmission during one stage in the movement of the pressure-responsive device and a materially different rate of transmission during another stage of the movement of the tube.

Having reference to Fig. 2, the Bourdon spring 1 carries near its free end, which in the particular construction is the outer end, an arm 6 the position of which varies as a function of the movement of the spring. In the particular instance, the arm 6 being rigidly connected to the spring, the movement of the latter causes an angular movement of the arm 6 which ordinarily is connected to the pen arm by means of an adjustable link.

While the invention may be carried out in different ways, I prefer to change the construction just referred to by applying a plurality of connecting links between the arm 6 and the pen arm 5.

As indicated in Fig. 2, two links 7 and 8 are pivotally connected at one end to arm 6 and at the other end to the pen arm 5. The relative position of the different parts, as shown in Fig. 2 is that incident to room temperature or about 80° F. It is therefore understood that for the lower range of temperatures, the arm 6 is turned farther in clock-wise direction, while for temperatures higher than 80° it turns in counter-clockwise direction.

Briefly expressed, the invention comprises a plurality of links, such as links 7 and 8, pivotally connected to the arm 6, on the one hand, and the pen arm 5, on the other hand, means permitting movement between the pivot connections of each link in the direction of length of the latter and spring means to resist such relative movement.

It is understood that provision must be made to permit one link or the other to yield in some way or other in the direction of its length. There are many ways to accomplish that purpose. For the sake of simplicity, I provide slots in the links and apply springs tending to hold the pivot connections relatively stationary against one end of the slots. Thus, in the particular embodiment, the arm 7 has a slot 7a while the arm 8 has a slot 8a at one end and a slot 8b at the other end. The spring resistances tending to maintain the links in a normal position relatively to the slots, in the particular instance are a coil spring 9 connected at one end to the link 8 and the other end to the pivot connection 5b of link 8 with the pen arm 5 and a spring coil 10 connected at one end to an extension 8c on link 8 and at the other end to the arm 6. The proximate function of spring 10 is to pull the link 8 lengthwise toward arm 6 so that the pivot connection 6b is normally positioned at the left end of the slot 8a. Thus, normally, the link 8 moves with arm 6 in the relative position dictated by spring 10. Similarly, the spring 9 acts upon the pivot 5b to pull the pen arm 5 to the left so as to position the pivot 5b at the left end of the slot 8b.

Again, spring 9 acts upon pen arm 5 to move it to the left as far as the slot 7a will permit it. Either the slot 8b or the slot 7a determines the final position of the arm 5 toward the left.

The operation is as follows:
The link 8 being connected to arm 6 at a point farther away from spring 1 than link 7 and being connected to pen arm 5 at a point nearer to the pivot end thereof than link 7, the rate of transmission effected by link 8 is considerably greater than the rate of transmission effected by link 7.

Having reference to Fig. 2, the pivot connection 5b is between the ends of the slot 8b but closer to the left end thereof. With drop of temperature, the arm 6 would move clockwise, as previously suggested. Since the rate of transmission through link 8 is greater than through link 7, the latter must be effective and the link 8 must slide relatively to pivot 5b until the latter, at the lower range limit comes to bear against the right end of slot 8b. With rise of temperature, the link 8 slides relatively to pivot 5b until the latter, at a predetermined temperature, in the particular instance 135° F., comes to bear against the left end of the slot 8b.

From this relative position, since the pivot 6b is held by spring 10 against the left end of slot 8a, the link 8 must act as the transmitting medium and link 7 must slide relatively to pivot 6a until the latter comes to bear against the left end of slot 7a. The movement of the pen arm during the action of link 8 as the transmitting medium is naturally large for a relatively small angular movement of arm 6. As soon as the left end of slot 7a has reached the pivot 6a, further movement of arm 6 can take place only by the movement of pivot 6b through slot 8a until it bears against the right end of the latter. During this period the link 7 again effects the transmission. Thus the rate of transmission is small at both ends of the scale range and large intermediate between the two end ranges.

In Fig. 3 I have shown a simple modification. The links 11 and 12 are connected to the arm 6 by the same pivot connection 13, but are connected to different parts of the pen arm 5 by means of pivots 14 and 15 respectively. The link 11 has a slot 11a and the link 12 has a slot 12a. A spring 16 connects the extension 12b with the arm 6.

Since link 11 is connected with pen arm 5 at a point farther away from the pivot of pen arm 5, than link 12, link 11 has the smaller rate of transmission and link 12 has the greater rate of transmission.

From the position illustrated, wherein the pivot 13 is bearing against the left end of slot 12a and against right end of slot 11a, movement of arm 6 to the left can take place only through link 12 as the transmission medium while movement to the right must take place through link 11. In the first case, the link 11 must move relatively to the pivot 13 until the latter comes to bear against the left end of slot 11a. In the second case, link 12 must move relatively to pivot 13 until the latter comes to bear against the right end of slot 12a. The first movement of arm 6, consequently, causes a large movement of pen arm 5 while the second movement causes a relatively small movement of pen arm 5.

It is understood that the principle of operation on which the invention is based may be carried out in many ways.

The rates of transmission may be changed relatively to and independently of each other by varying the position of the pivot connections relatively to each other. This may be accomplished by providing a slot 17 in arm 5, as indicated in Fig. 2, or by providing a similar slot in arm 6 or in both arms.

I claim:

1. In instruments of the character described, the combination with a driving element including an arm having angular motion, a driven element pivotally supported near one end, of two links pivotally connected to said arm and the driven element, said arms being of such relative length and so disposed relatively to the arm and the driven element as to transmit motion at different rates, means on the arm, the links and the driven element for causing one link to transmit motion during one part of the range of motion of the driving element and for causing the other link to transmit motion during another part of the range of motion of the driving element and means for changing the effective length of one link relatively to the other link.

2. In instruments of the character described, the combination with a driving element including an arm having angular motion, a driven element pivotally supported near one end, of two links pivotally connected to said arm and the driven element, said arms being of such relative length and so disposed relatively to the arm and the driven element as to transmit motion at different rates, means on the arm, the links and the driven element for causing one link to transmit motion during one part of the range of motion of the driving element and for causing the other link to transmit motion during another part of the range of motion of the driving element and means for changing the effective length of both links relatively to each other.

3. In instruments of the character described, the combination with a driving element including an arm having angular motion, a driven element pivotally supported near one end, of two links pivotally connected to said arm and the driven element, said arms being of such relative length and so disposed relatively to the arm and the driven element as to transmit motion at different rates, means on the arm, the links and the driven element for causing one link to transmit motion during one part of the range of motion of the driving element and for causing the other link to transmit motion during another part of the range of motion of the driving element, means for changing the effective length of either link relatively to the other and means for changing the position of the links relatively to the arm and the driven element.

In testimony whereof I affix my signature.

ALBERT E. CLAWSON.